Figure 1:
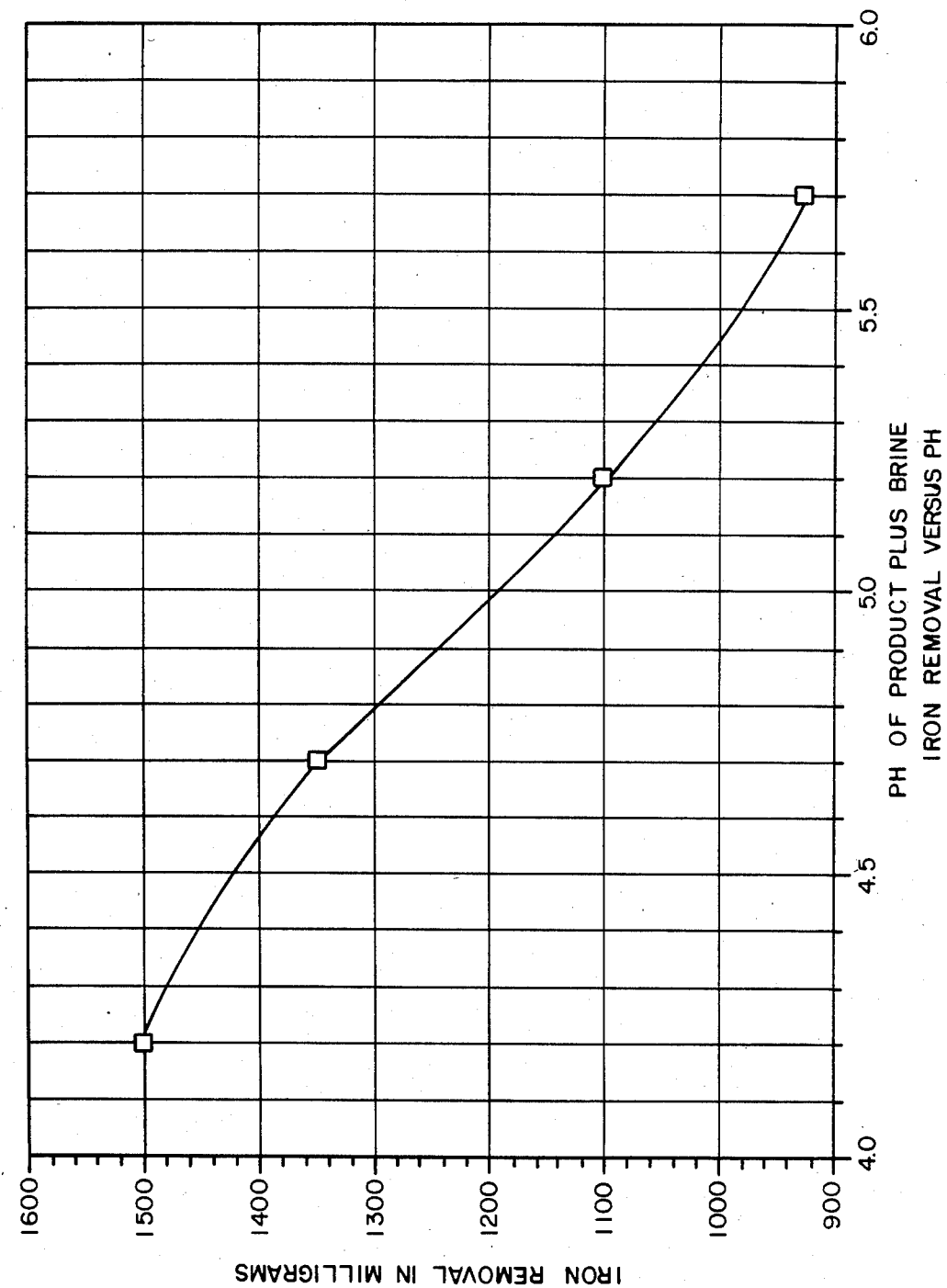

United States Patent [19]

Operhofer

[11] Patent Number: 4,664,811

[45] Date of Patent: May 12, 1987

[54] PREVENTION OF IRON FOULING OF ION EXCHANGE RESINS

[75] Inventor: Alfred W. Operhofer, Downers Grove, Ill.

[73] Assignee: Nalco Chemical Company, Oak Brook, Ill.

[21] Appl. No.: 750,639

[22] Filed: Jul. 1, 1985

[51] Int. Cl.$^4$ .............................................. B01J 49/00
[52] U.S. Cl. .................................. 210/673; 210/674; 521/26
[58] Field of Search .................. 210/673, 674; 521/26

[56] References Cited

U.S. PATENT DOCUMENTS

| 3,078,224 | 2/1963 | Schulze et al. | 210/673 |
|---|---|---|---|
| 3,139,401 | 6/1964 | Hach | 210/673 |
| 3,262,876 | 7/1966 | Hronas et al. | 210/673 |
| 3,262,883 | 7/1966 | Fisher | 210/673 |
| 3,887,498 | 6/1975 | Kuhajek et al. | 210/674 |

Primary Examiner—Ivars Cintins
Attorney, Agent, or Firm—John G. Premo; Donald G. Epple

[57] ABSTRACT

A process for removing and preventing iron contamination of water treatment solids which tend to become iron fouled which comprises cyclically treating said water treatment solids with an aqueous solution containing an effective amount of:

(a) a reducing agent;
(b) a chelating agent;

with a pH of said treating solution having been adjusted to within a range of about 4–6.

6 Claims, 7 Drawing Figures

IRON REMOVAL VERSUS PH

PREVENTION OF IRON FOULING OF ION EXCHANGE RESINS

INTRODUCTION

Frequent reports indicate that iron fouled ion-exchange resins clean poorly with reducing agents alone, and sometimes also with acids. It appears that a cyclic preventive treatment to prevent the accumulation of large amounts of iron on an ion exchange resin is a better approach to reduce the "fouling effect" of iron fouled resins.

Usually resins that have been allowed to become fouled over a long time period, i.e. more than a few days, will also undergo various other accumulations of fouling, for example: silica will co-precipitate with iron to form an insoluble precipitate. Ion-exchange resins may also become surface coated or fouled with organic and/or biological foulants which will tend to pick up both ionized and non-ionized iron and hold this iron until the organic or inorganic foulant is removed. These problems, of course, can exist with any surface, porous or non-porous, such as wood, ceramics, steel, plastic and the like. However, the ion-exchange resin bead surface is unique from the surfaces listed above, primarly because it is both porous and non-porous and has exposed thereon specific definable ion-exchange functionality depending on the type of resin bed.

In addition to the iron fouling problem described above, another problem that tends to occur in ion exchange resins and other water treatment solids comprises another form of fouling. Specifically, water softeners and demineralizers filter particulate matter from feed waters. These particles and the resins themselves also absorb naturally occurring and synthetic organic substances such as lignins, tannins, humates, oils, grease, water-soluble or dispersible polymers, etc., which may be excellent nutrients for bacteria or which may be direct foulants themselves. As the bacteria multiply, bacterial slime, micro-organisms and waste products thereof can accumulate. Particulate and soluble iron may become entrapped in the mixture of organic substances. Removal of organics may also release entrapped iron. These factors can drastically influence the performance of an ion-exchange unit through shorter operating periods before regeneration, lowered resin capacities and poorer effluent water qualities. In addition, treated water containing micro-organisms and their waste products can present health problems, depending on the use of the water.

THE INVENTION

The invention comprises a process for removing and preventing iron contamination of water treatment solids which tend to become iron fouled which comprises cyclically treating said water treatment solids with an aqueous solution containing an effective amount of:
 (a) a reducing agent;
 (b) a chelating agent;
with a pH of said treating solution having been adjusted to within a range of about 2–8.

While the process of the invention can be used to remove iron from resins that contain large amounts of iron contamination, the invention is primarily directed to preventing iron fouling by removing small traces of iron from clean or freshly prepared resins.

To accomplish this prevention and removal of small amounts of iron from ion exchange resins and other water treatment solids, it is beneficial that the treating agents of this invention cyclically contact the water treatment solids. This is best accomplished by the addition of the chemicals described above, and to be described more completely below, to the regeneration chemicals used to re-establish ion-exchange resin capacity. The preferred process is the addition of these treatment chemicals to the brime or acids/bases used to regenerate the ion-exchange resin.

The resins are regenerated using standard regeneration chemicals and techniques, but the regeneration chemicals, such as brines, acid or base solutions, also contain the treating agents of this invention. The regenerating agents of this invention include in combination both a reducing agent and a chelating agent. The reducing agent is prefereably a mild reducing agent such as the hydroxyketo reducing sugars or the quinon/hydroquinone based reducing agents. The chelating agents are multi-carboxylate agents, particularly the polydentate chelating agents such as EDTA, NTA, and the like. In addition to the combination of reducing agent/chelating agent of this invention, these treating agents may optimally also contain surfactants, bio-dispersants, soaps, pH buffers, and the like, the presence of which may optimize the iron removal capacity of the treating agents containing the combination of reducing agents and chelating agents, as well as accomplish other specific goals such as pH buffer, solids dispersancy, biological growth colony dispersal, and the like.

The Reducing Agents

The reducing agents may be selected from a wide variety of chemicals. They include but are not limited to such reducing agents as ascorbic and erythorbic acids, hydrosulphites, oxalic acid, sodium oxylate, the hydroquinones, reducing sugars such as D-glucose, catechol, and tannin or tannic acids. These compounds are only illustrative of the many well known reducing agents that may be used. When they are used to treat ion exchange resins, particularly those that are used to treat potable waters, care must be used in selecting the reducing agent that is relatively non-toxic. A preferred reducing agent useful in the practice of the invention is erythorbic acid or its related compound, ascorbic acid, or their common water-soluble salts.

Other organic reducing agents are disclosed in U.S. Pat. No. 4,278,635, incorporated herein by reference and made a part hereof.

The Chelating Agents

The chelating agents may be selected from a wide group of chelating agents. A preferred group are represented by the so-called "amino carboxylic acid" chelating agents which are represented by the most preferred chelant used in the practice of the invention, e.g. ethylene diamine tetra acidic acid (EDTA). Other amino carboxylate materials are the hydroxy ethyl anino acidic acids, the nitrilo acidic acids illustrated by the compound, nitrilo tri acidic acid (NTA). Other amino carboxylic acid chelants are the so-called alkylene polyamines which have been in whole or in part reacted to provide pendant carboxylic acid groups from the nitrogen atoms contained in these compounds.

Another class of chelants are the so-called "amino phosphonates" which are described in U.S. Pat. No. 4,132,526, which is incorporated herein by reference.

Other chelants could include carboxylate materials such as citric acid, gluconic acid, and the like.

It is, of course, understood that the chelant selected should have good chelating activity for iron, particularly for the ferrous oxidation state of iron.

pH of the Aqueous Solutions Used to Treat the Iron Contaminated Solids

The reducing agents and the chelating agents are employed in the form of aqueous solutions whose concentrations may vary between a fraction of a % by weight up to the saturation solubility of the compounds employed. In certain instances, the reducing agents aren't entirely soluble and may be employed in the form of slurries, emulsions, dispersions, and the like.

An important concept of the invention resides in adjusting the pH of these treating solutions to within the range of 2-8 and, preferably, within the range of 4-6. This pH range optimizes the effectiveness of the reducing agents, particularly erythorbic acid.

To adjust the pH of the treating solutions, the invention contemplates using as the pH adjusting reagents low molecular weight aliphatic carboxylic acids with acetic and citric acids being preferred. While mineral acids may be used for the pH adjustment, they do not represent a preferred embodiment of the practice of this invention. It is most preferred that the treating agents contain pH buffer components which are capable of controlling pH within the preferred pH range of from about 4.0 to about 6.0. Standard pH buffers using the acetate:acetic acid acid/base equilibrium are particularly useful.

The amount of reducing agent and chelant used to practice the invention is related to the amount of iron contained in a particular water used to contact water treatment solids such as an ion exchange resin. It is known that to solubilize 1 ppm Fe, 8.4 ppm EDTA and 3.2 ppm erythorbic acid are required at a pH of 4.0 to pH 5.5. On a basis of Fe on a resin, this ratio applies as stated. When manganese and other oxidized substances may be reduced by erythorbic acid, this ratio will change.

The invention also contemplates combining the reducing agent and chelant with a known so-called "dispersant treatment" to remove organic fouling from contaminated resins or to prevent it. This problem of organic fouling has been described above.

The combined use of a nonionic surfactant and a bio-dispersant can remove micro-organisms and waste products thereof, as well as organic foulants and oil and grease foulants from ion exchange resins and other water treatment solids. Tests indicate that a substantial improvement in water qualities and in ion exchange resin capacities for both water softener and demineralizer resins are obtained by cleaning the resins with an effective amount of a nonionic surfactant and a biodispersant as described below. A combination of these nonionic surfactants and bio-dispersants can also be used to maintain water treatment resins in peak operation conditions by treating resins on a continuous and cyclical basis during the regeneration or the backwash cycle used in the regeneration process. The combined treating agent also provides a steady removal of organic anions that severely foul strong base anion exchange resins.

It has also been found that these reducing agent/chelant products, when used with surfactant/bio-dispersant combination products, may also be improved by the addition of certain microbiocides.

The Non-Ionic Surfactants

The non-ionic surfactants of this invention preferably have an HLB between 6 and 14. HLB stands for the hydrophilic lipophilic balance and is used as described in the publication by McCutcheon's publications on *Detergents and Emulsifiers,* North American Edition and International Edition, 1974 Annuals, published by McCutcheon's Division, Allured Publishing Corporation, 45 N. Broad St., Ridgewood, N.J., USA. These non-ionic surfactants are preferably chosen from the group consisting of the non-ionic ethylene oxide adducts of alkylated phenols, the non-ionic ethylene oxide adducts of fatty alkyl alcohols, the non-ionic sorbitan esters, and the non-ionic alkyl aryl polyethylene glycol ethers. The preferred non-ionic surfactant is ethylene oxide adducts of alkylated phenols which have an HLB between 6 and 14. The most preferred non-ionic surfactant is an ethoxylated nonyl phenol containing about 9 moles of ethylene oxide. Another preferred surfactant is a glycol ether of a long chain fatty alcohol, or an ethoxylated or propoxylated ether of an alkyl fatty alcohol, particularly if the biodispersant Biomans change is below about 257.

The Bio-Dispersants

The bio-dispersants are preferably chosen from the group consisting of ethylene oxide condensates with propylene oxide adducts on propylene glycol having an HLB between 4-10 and a molecular weight between 1000-5000, nonionic polyethoxylated straight chain alcohols, tris cyanoethylated cocodiamines, polyoxyethylene sorbitan ester/acids, nonionic N,N,dimethyl stearamides, nonionic amine polyglycol condensates, and nonionic ethoxylated alcohols. Table I shows the types of chemicals which have been demonstrated to have bio-dispersant properties.

TABLE I

| Evaluation of Compounds for Bio-Dispersancy 10 ppm with 1 hour contact Data Collected with Biometer | |
|---|---|
| Dispersant Chemical Type | % Biomass Change |
| nonionic (polyol) condensate of ethylene oxide with hydrophobic bases (propylene oxide with propylene glycol) | 66.4% |
| nonionic polyethoxylated straight chain alcohol | 58.5% |
| tris cyanoethyl cocodiamine | 47.3% |
| polyoxyethylene sorbitan ester of fatty and resin acids and alkyl aryl sulfonate blend (nonionic) | 45.8% |
| cationic ethylene oxide condensation products of Duomeen T* | 35.8% |
| nonionic N,N—dimethyl stearamide | 34.7% |
| monoamine (cationic) (cocomononitrile) | 31.3% |
| low MW polyacrylate (MW 1000–10,000) | 31.1% |
| nonionic - amine polyglycol condensate | 30.0% |
| cationic - cocodiamine | 25.6% |
| nonionic ethoxylated alcohol | 21.2% |

*Duomeen T = N—tallow-trimethylene diamine

The % biomass change in Table I was measured by exposing a slime mass previously grown and attached onto a surface to clear recirculating water at about 100° F. The water contained 10 ppm of each of the indicated biodispersants and it was allowed to recirculate at temperature for one hour. At the end of that time period, a biomass assay was made of water collected in a common basin by using a duPont 760 Luminescense Biometer which is described in the publication, *duPont 760 Luminescence Biometer*, published in December, 1970, and described in U.S. Pat. No. 3,359,973, which is incorporated herein by reference.

This Table shows the percent of clumped biomass dispersed by treatment with 10 ppm of the indicated dispersant. Although other dispersants were tested which had lower than 20% effectiveness, this data is not presented since any dispersant having less than 20% effectiveness in these tests would be found not to function adequately in this invention.

Revitalizing Agent—Surfactant/Bio-Dispersant Formulations

The weight of surfactant to dispersant in the treatment mixture can vary from about 0.1:10 to about 10:1 and preferably is from about 1:2 to 2:1. A 1:1 weight ratio has been found to be particularly effective.

Where a quaternary amine biocide is used along with the surfactant and dispersant, it can be present in an amount of from 1 to 50% by weight and preferably from 10 to 30% by weight based on the weight of the total mixture. These cationic biocides are preferably not used when cleaning cationic exchange resins.

The Biocides

The biocides of this invention are chosen from the group of fatty alkyl quaternary salt biocides, nonionic bromo, nitrilo substituted proprionamides, the isothiazolines, and the oxidative biocides. The fatty alkyl quaternary salt biocides are exemplified by and are preferably an alkyl dimethyl benzyl ammonium chloride quaternary ammonium salt biocide. The nonionic biocide may be preferably dibromo, nitrilo proprionamide, although this material is not stable under basic pH conditions, so its effective use is limited to neutral or mildly acidic conditions. The isothiazolines are best described as KATHON 886 and primarily manufactured by the Rohm & Haas Co. These biocides are described in a previously referenced product bulletin, made a part hereof.

The oxidative biocides are materials such as chlorine, bromine, hypochlorous acid, hypobromous acid and alkali metal salts of the hypochlorous and hypobromous acids. Herein, alkali metal salts means those salts containing sodium, potassium, ammonium, and rubidium cations.

The Combined Product Concepts

As indicated, the iron preventative concepts of the invention may be combined with the known dispersant and biodispersant/biocide concepts described above to provide an improved treatment for preventing any type of resin or water treatment solid contamination. The amount of the various ingredients that may be used may be changed depending upon the nature of the contaminants contained in the water source being treated.

To illustrate the invention, the following are presented by way of example.

Typical compositions used in the practice of the invention are:

| Composition 1 | |
|---|---|
| 130 g | hydroquinone |
| 400 g | EDTA |
| 25 g | Erythorbic acid | in D.I. water was made, and made up to 2 liters.

| Composition 2 | |
|---|---|
| Components | Wt. % |
| Erythorbic acid | 8.0 |
| EDTA | 3.9 |
| Acetic Acid-Glacial | 1.0 |
| Quaternary Amine | 0.05 |
| Water (softened) | 87.05 | pH = 4.65
Color: Sl. yellow

| Composition 3 (100% active) | |
|---|---|
| Components | Wt. % |
| EDTA, 39% sol. | 77.4 |
| Erythorbic acid | 17.8 |
| Acetic Acid-glacial | 4.8 |
| Quaternary Amine | 0.002 |

| Composition 4 (100% active) | |
|---|---|
| Components | Wt. % |
| EDTA, 39% sol. | 75.0 |
| Erythorbate, Na salt | 20.1 |
| Acetic Acid-glacial | 4.9 |
| Quaternary Amine | 0.002 |

| Composition 5 (24.0% actives in water) | |
|---|---|
| Components | Wt. % |
| Sodium erythorbate | 2.8 |
| Na$_4$ EDTA, 39% | 18.5 |
| Acetic Acid-glacial | 1.5 |
| Citric acid (100%) | 3.2 |
| Quaternary Amine Biocide | 0.002 |
| Tergitol (non-ionic surfactant) | 0.002 |
| Pluronic L-62 LF | 0.001 |
| H$_2$O | <76.0 |

EXAMPLES

Example 1

Feasibility Study to Remove Iron from Fouled Water Softener Resin Resin: Water Softener Resin, Armak, E received. The resin has 144 g Fe/Ft$^3$ plus a substantial amount of iron sulfide coating the resin and on the inner matrix. Used 50 ml resin in a 100 ml burette.

To 100 ml 10% NaCl, I added 2.5% erythorbic acid plus EDTA Na$_4$ (i.e. 1.25% of each). The solution had a pH of 4.65. The solution passed over the resin in 1 hour. The last portion ($\sim \frac{1}{2}$) was left in contact with the room over the weekend, then rinsed out.

Fe—removed: 139 mg/liter=82.7 grams/ft$^3$= ~57% Fe removed.

EXAMPLE 2

0.75% erythorbic acid
0.75% EDTA Na$_4$ 1.5% added to 100 ml 10% NaCl. Passed over another 50 ml of the resin—in two hours. The iron removed was 61.2 g/ft$^3$, or 135 mg/50 ml = ~43% of Fe removed.

The same resin was then treated with more NaCl (10%): Removed another 2.3 g/Fe/ft$^3$, or ~27 mg/50 ml.

EXAMPLE 3

Prevention of Iron Fouling

Objective: Remove the amount of iron from a water softener resin that normally accumulates between regenerations, i.e. in this case the maximum that could accumulate.

Experiment:
400 mg Erythorbic Acid
400 mg EDTA were added to 100 ml 10% NaCl. Passed through 50 ml resin in 1 hour. Rinsed with 10 bed volume of D.I. water. Treatment solution pH was 5.0. The amount of iron removed was 22 g of iron/ft$^3$ resin.

Observation: The resin treated was rinsed slowly with D.I. water. A substantial amount of color was removed. An analysis for iron showed 4 ppm iron removed, i.e. an additional ~3.5 g/ft$^3$.

EXAMPLE 4

Use of Hydroquinone

Objective: To determine, on a side by side basis, the effectiveness of hydroquinone vs. erythorbic acid.

Experiments:

As in all other experiments, any iron fouled resin was first treated with the equivalent of 12 lb. NaCl/ft$^3$ or resin, or 100 ml 10% NaCl/50 ml of resin. Then the subsequent experiments were carried out with the treated resins, e.g. regenerated resins.

No. 1

A solution was prepared containing 25 g of hydroquinone, 40 g EDTA, and 3 g of acetic acid, made up to 1 liter with D.I. water.

20 ml of this solution was mixed with 100 ml of 10% NaCl = pH 4.6. The solution was passed through a 50 ml portion of an iron fouled resin (140 grams Fe/ft$^3$). Contact time was 1½ hr. The effluent was analyzed for iron = 58 mg iron, as Fe, was solubilized and removed.

The solution now containing this iron and spent salt was heated to 150°–160° F., caustic added to pH = 14.0. Iron precipitated from solution. To this solution added HCl to pH 4.8, and mixed with 1 gram of pulverized metallic iron. Also added ~0.1 g of Na$_2$S$_2$O$_4$. Then heated the solution, boiled off the water, to concentrate to 100 mls. Passed this solution through another portion of 50 ml iron fouled resin. Removed another 44 mg of iron. Possibly the quinone was changed back to hydroquinone.

EXAMPLE 5

Use of Catechol 13 g Catechol
40 g EDTA
5 g Acetic Acid

Solution above was made up in 500 ml water plus product. This mixture was passed (12 ml) through a 50 ml resin column, in a 100 burette, in 1½ hours, along with 100 ml of a 10% NaCl regenerant solution.

Fe in effluent: 23 mg Fe.

Conclusions & Observations:

The resin had turned to a dark brown color. Possibly some of the catechol has remained with the resin or with the iron on the resin. However, the experiment was positive since iron was effectively removed.

EXAMPLE 6

Experiments to solubilize hematite and magnetite

Attempts were made to solubilize pulverized hematite and magnetite. 1 gram of each was placed into beakers and 100 ml of stock solution was added, plus 100 ml of D.I. water. After 4 hours the solution was filtered off. After 4 hours "insufficient" Fe was solubilized. The solution and iron were removed and allowed to stand for one week. More Fe was solubilized, but I stopped these experiments. Reason: The pulverized iron needs to be placed into water for a sufficient time length to assure sufficient hydrolysis and an acceptable reaction time.

EXAMPLE 7

Solubilizing Hematite and Magnetite with Erythorbic Acid and EDTA 1 gram of each of the above was placed into beakers with D.I. water overnight, then

| Addition | pH Adj. | Fe Solu. |
|---|---|---|
| 100 mg EDTA 50 mg E.A. | 10 mg HAc pH 5.5 | 3 mg |
| to Magnetite | 50 mg HAc pH 5.3 | 6 mg |
| " | 100 mg HAc pH 5.0 | 11 mg |
| " | 200 mg HAc pH 4.6 | 10 mg |
| " | no HAc pH 5.7 | 3 mg |
| to Hematite | no HAc pH 5.7 | 2 mg |
| " | 10 HAc pH 5.4 | 9 mg |
| " | 100 HAc pH 4.9 | 14 mg |
| " | 200 HAc pH 4.55 | 17 mg |
| " | 300 HAc pH 4.35 | 14 mg |

Conclusions

It appears that hematite requires a lower pH than magnetite. The overall appraisal of these experiments is that not sufficient iron was solubilized. Possibly the iron particles are not sufficiently hydrolized to read within 4 hours. More time may be needed. In this case, however, experiments with resins is more realistic.

EXAMPLE 8

Solubilize Iron & Remove from Fouled Softener Resin with Individual Components

Resin: Sample cation resin
Amount: 50 ml each
Iron: 144 grams/ft$^3$
Experiments: Passed 100 ml 10% NaCl through 50 ml resin. In all cases, i.e. for every experiment. The resin portions were then rinsed with 6 bed volumes of D.I. water, i.e. about two times the normal rinse volume required to remove any excess salt. This regeneration removed 25 mg Fe from the 50 ml resin.

The individual portions were then treated with the components listed below:

| | |
|---|---|
| Contact time: 2 hours | |
| Temperature: 72° F. | |
| Rinse: 6 bed volumes (300 ml)[1] at 0.5 gpm/ft$^3$. | |
| Treatment: mg Fe removed per 50 ml resin | 25.0 |
| 100 ml 10% NaCl pretreatment | |
| prior to any treatment | |
| no additive | |
| Then: | |
| 40,0 mg erythorbic acid + | 9.3 |
| 100 ml 10% NaCl | |
| 80,0 mg EDTA + 10 mg HAc + | 31.0 |
| 100 ml 10% NaCl | |
| 40,0 mg erythorbic acid | 18.0 |
| 80,0 mg EDTA | |
| 10,0 mg HAc | |
| no NACl | |
| 100 HAc | 100 |
| 400 erythorbic acid | |
| 800 EDTA | |
| no NaCl | |
| 100 HAc | 123.0 |
| 400 erythorbic acid | |
| 800 EDTA = | |
| 100 ml 10% NaCl | |
| $\frac{123 \times 28,320}{50 \times 1000} = 70$ grams Fe/ft$^3$ | |

EXAMPLE 9

Calculations, Ratio E.A.—EDTA

Theoretical:

E.A. ~176=(erythorbic acid)
EDTA ~380=(chelant, Na$_4$)

88 g E.A. can react with 1 mole Fe, 0056 g Fe or 88 g can dissolve 56 g Fe. This amount will need 380 g EDTA.

Actually, tests indicate that ~44 g Fe is solubilized with 88 g E.A., instead of 56 g—67% has reacted.

Practical

By calculations, 100 grams of E.A. should remove 34.7 g iron. Tests by dissolving Fe with product shown on page 201 show a solubilization of only 66.5% of theoretical.

50 ml of a cation sample were placed into a 100 ml burette and 10 ml of solution (shown on page 201) were combined with 100 ml 10% NaCl. This mixture had a pH 4.7.

This mixture was passed through in 1 hour, then the resin was rinsed with 5 bed volumes.

Total iron removal was 7.7 g/ft$^3$.

Calculated, or theoretical removal should have been 11.3 grams/ft$^3$.

After the resin was allowed to stand for 2½ days, the D.I. water plus 1 bed volume additional rinse showed an additional 1.2 mg. or 0.6 grams/ft$^3$. Note: There seems to be a definite rinse out problem if the iron is incompletely removed.

With these results, it would seem reasonable to propose various components for an iron fouling prevention product(s):

Erythorbic Acid

To reduce iron and help solubilize Fe.

Other polyhydroxy compounds such as reducing sugars, or hydroquinone are and should remain as possible candidates for the same purpose.

Chelants or Complexing Agents

EDTA currently used.

Citric Acid, tannin, other chelants or complexing agents should be considered. Use liquid products to formulate, such as 39% Na$_4$EDTA.

Citric Acid: Will add H+ ions to the mixture, i.e. to obtain a desired pH. Current pH ranges are pH 4 to 6. Also, citric acid will complex iron, thus reducing the use of EDTA.

Suggestion: Use liquid citric acid to formulate with.

Quaternary Amine: Add as a sanitizer and/or biocide to avoid growth of bacteria in the next product. Use of quaternary amine biocides are suggested.

Dispersant-type additives: To help reduce fouling due to organics and bacterial slime, a repeated use of these formulated ingredients is desirable before adding or using an iron fouling prevention product. Or simply, add a water-soluble type surface active agent and a bio-dispersant to the iron dispersant product.

Acetic Acid. This acid is low in toxicity, can adjust the pH plus provide an approximate buffer. Also, acetic acid may slowly remove and may help prevent accumulation of Pb, Sr and Ba.

Product Concept Testing

The erythorbic acid and EDTA ratios above are not necessarily optimized, but are primarily based on theoretical calculations. An optimization of the erythorbic acid requirement can be done more realistically when the concept is being tested on the basis of a preventive maintenance, i.e., prevention of iron fouling, cyclical program. The preliminary formula, as shown, was used for the purpose of establishing performance criteria such as pH, time and temperature. Please note that the amount of erythorbic acid used for these experiments is considerably higher than the previously calculated values. The extra amount of erythorbic acid was used when it became evident that testing in open containers and columns seemingly resulted in a loss of iron reducing, i.e., solubilizing capability.

| Preferred Product Formulations (PPF) | | | |
|---|---|---|---|
| Mix Order | Components | R-No. | Wt. % |
| 1 | Degasified D.I. water | — | 86.50 |
| 2 | EDTA Solution | 793 | 7.75 |
| 3 | Erythorbic Acid[1] | 2620 | 3.60 |
| 4 | Quaternary Amine, Onyx | 2197 | 0.004 |
| 5 | Tergitol 15-S-9 | 2079 | 0.004 |
| 6 | Pluronic L-62 | 2060 | 0.002 |
| 7 | Acetic Acid - adjust to pH 4.7 | 3099 | 2.14 |
| | | Total | 100.00% |

[1]Formulas can also be prepared with sodium or ammonium erythorbate. In this case, more acetic acid is required to lower the pH to the preferred range. When this product is added to 10 percent salt, a pH 4.1 is obtained, providing deionized make up water is used.

The drawings show test results according to the invention.

Effect of pH

The effectiveness of erythorbic acid as a reducing agent is maximized at between pH 4 to 6. Because other product components are involved that could become an influencing factor plus the reaction with the ion exchange resin by itself, the following data was established.

138 ml portions of a water softener resin, containing 480 grams of iron per cubic foot of resin, or 2339 mg Fe/138 ml resin, were placed into 5/8 inch columns. Prior to each experiment, 270 g. of 10 percent salt solution (20#.cu.ft.) was passed through the column to assure that no ionized iron remained on the resin. This amount of ionized iron was relatively low—only 5 mg $Fe^{++}$ were removed in this manner.

Mixtures of 273 gram of the PPF plus 166.5 gram of saturated brine were made, and adjusted to pH 4.2, 4.7, 5.2 and 5.7 with caustic or acetic acid, as required. These solutions were passed through the resin portions at proper flow rates to assure 1½ to 2 hour contact times.

The data is shown in FIG. 1. It illustrates that optimum iron solubilization and removal is achievable at pH 4.2, and a significant removal is still obtained at a pH 4.7.

Effect of Time

Here also, several columns containing 138 ml (30 inch bed height) of the same water softener resin containing 2339 mg iron were set up, and salt passed through to remove soluble iron.

Each treatment solution consisted of 273 grams of PPF plus 166.5 grams of saturated sodium chloride solution, followed by a "standard" amount of slow and fast rinse water.

Figure 2:
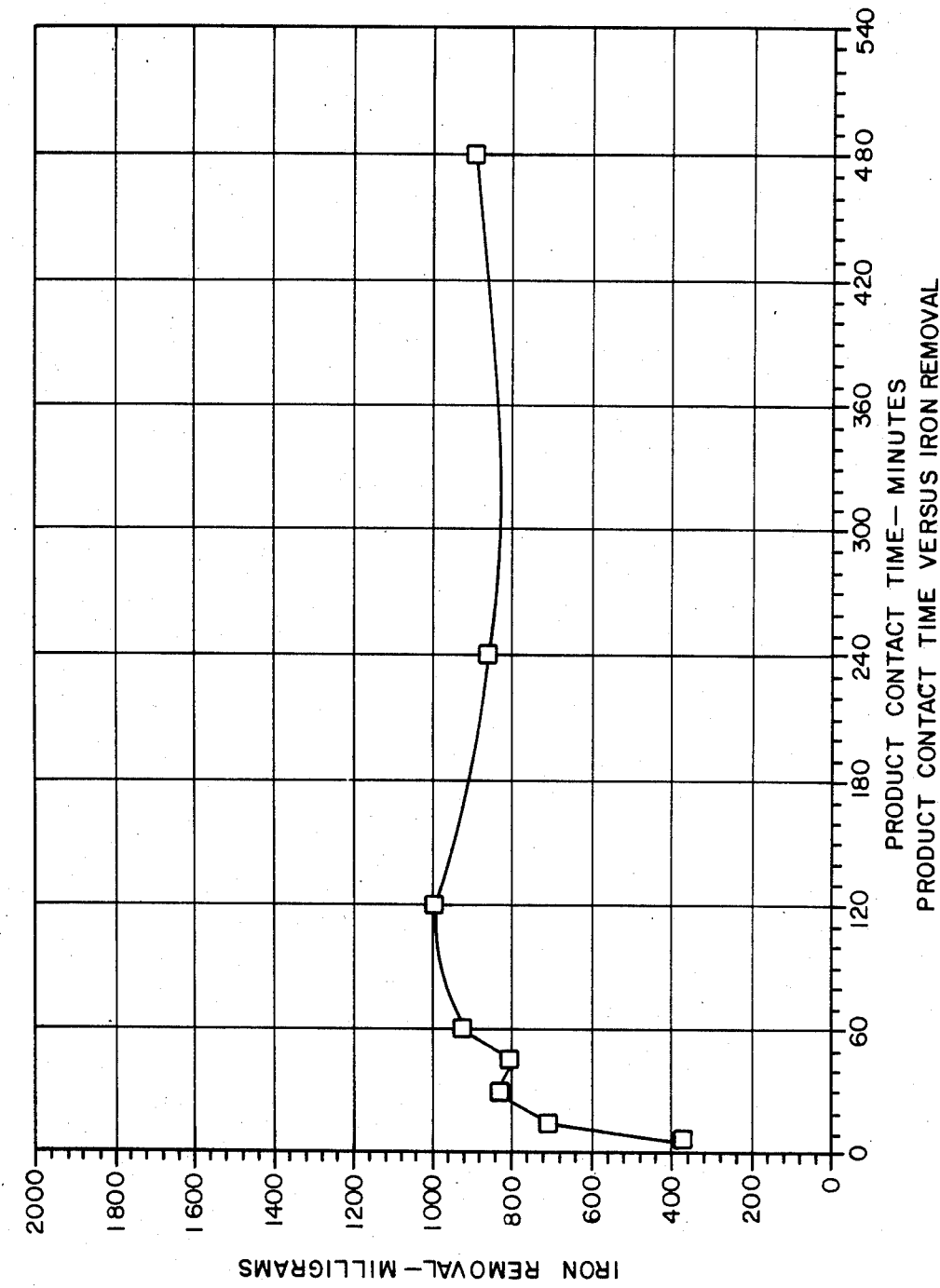

The results are shown in FIG. 2.

As can be seen from the data, an optimum iron removal is obtained at a contact time of about one hour. Possibly, a variation of as much as ± ten percent may be in a realistic range.

Effectiveness of the Individual Components and of the Component Mixture

For each experiment, a separate resin portion of 138 mls was used. The sample treated was the same as before and contained approximately 2339 mg of iron.

The contact time for each treatment solution was 1½ hours, and the treatment was followed by a slow and fast water rinse.

Experiment No. 1: 166.5 grams saturated brine 273 grams water plus sufficient acetic acid to obtain a pH 4.2

Experiment No. 2: 8190 grams[1] EDTA 166.5 grams saturated brine 270 grams water plus acetic acid to a pH 4.2

Experiment No. 3: 9820 grams[2] erythorbic acid 166.5 grams saturated brine 270 grams water plus acetic acid to pH 4.2

Experiment No. 4: 273 grams of PPF (see above) 166.5 grams saturated brine

[1] This is the relative quantity of EDTA used in Experiment No. 4
[2] This is the relative quantity of E.A. used in Experiment No. 4

The pH of these solutions was adjusted to pH 4.2 using acetic acid.

Figure 3:
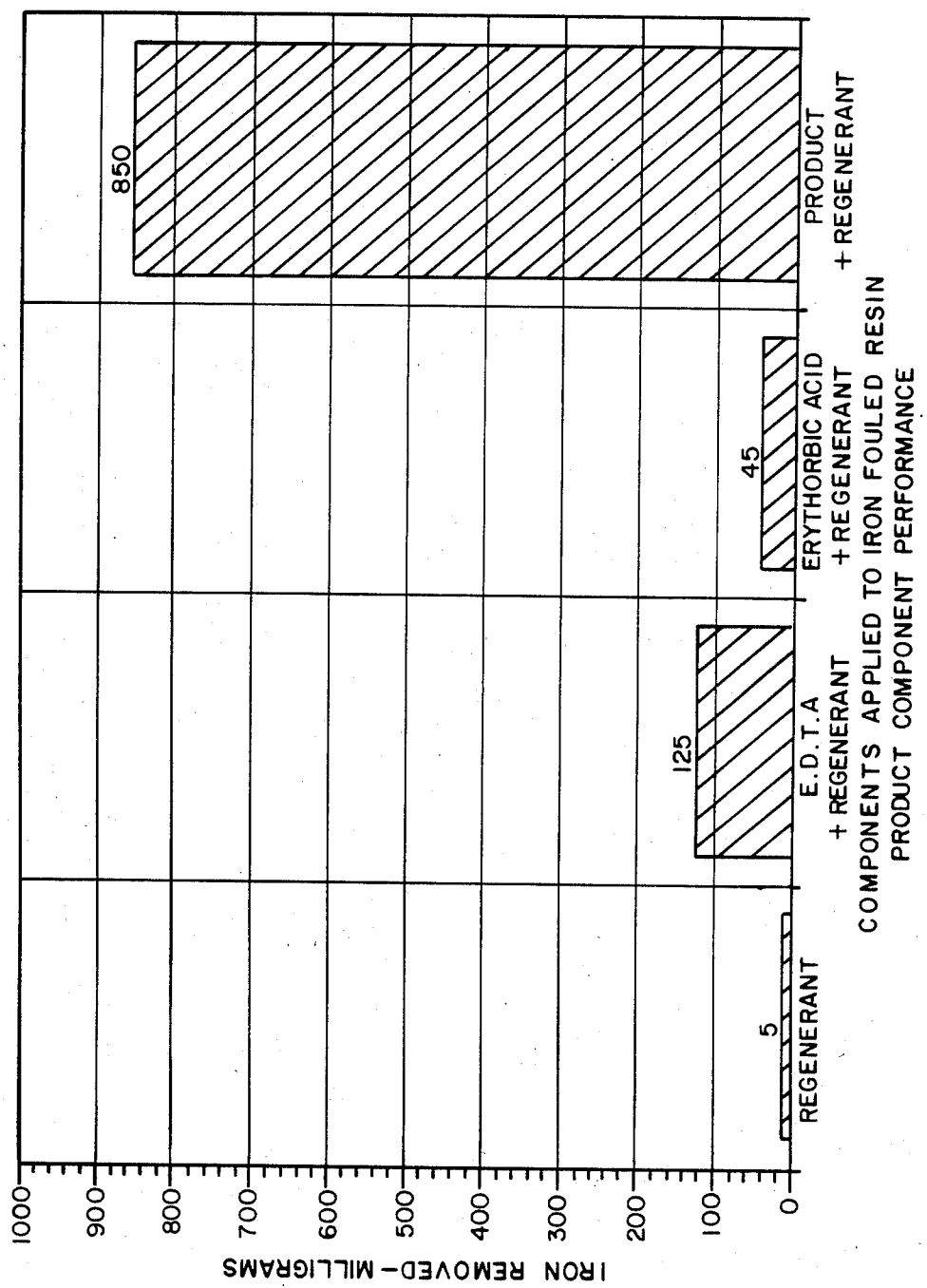
Figure 4:
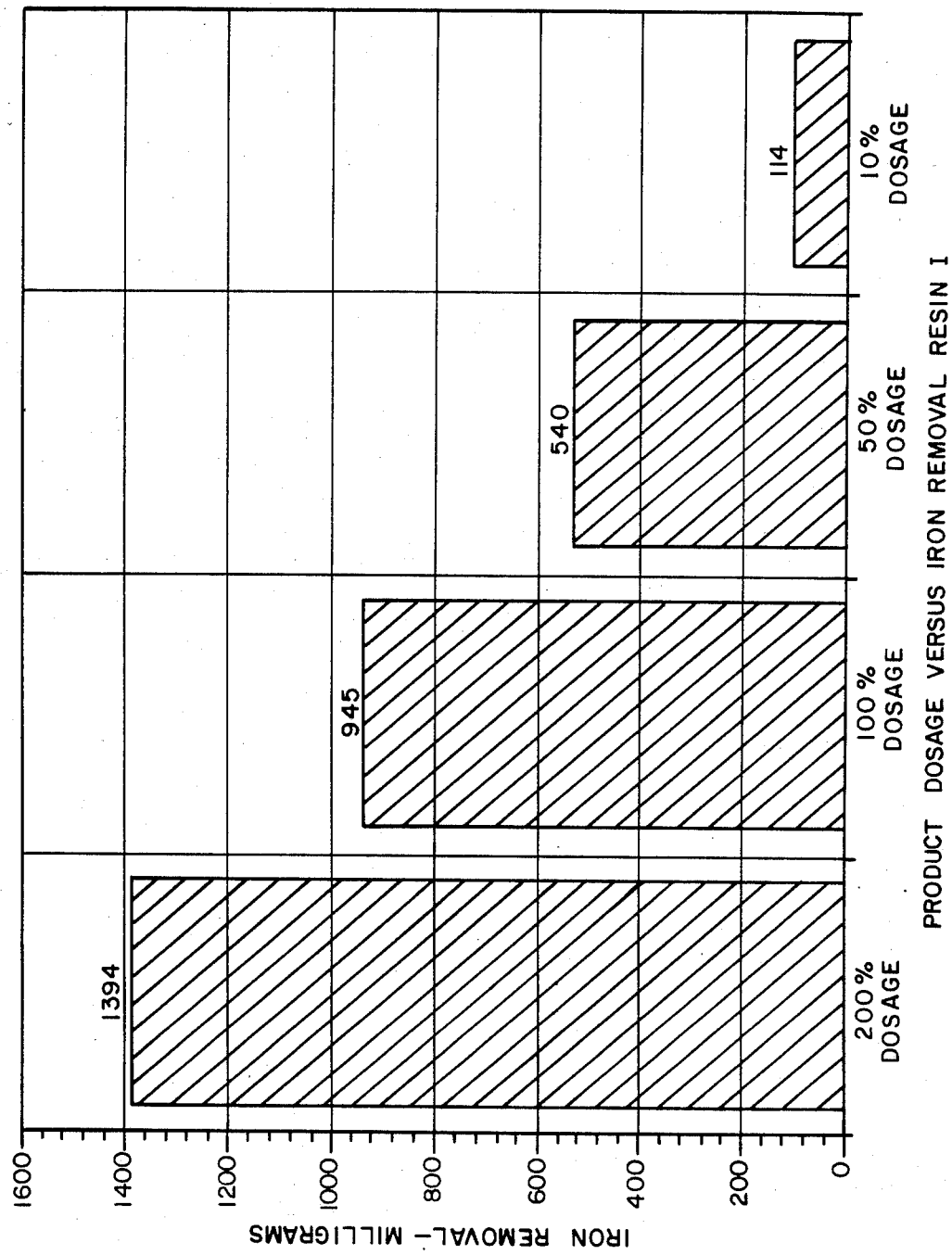

The test results are shown in FIG. 3.

The results indicate that a synergistic effect of the components exists. In fact, approximately 20 times the amount of iron was removed with the component mixture than with erythorbic acid alone. Surprising was the removal by EDTA; i.e., only 15 percent of the amount removed by the component mixture.

Optimizing Erythorbate

All experiments described above were done with a large excess of erythorbate for the purpose of avoiding the possibility of underdosing while experimenting in open-head beakers, bottles and columns.

Experiments were therefore completed in an attempt to optimize erythorbate concentrations needed to achieve iron removal.

Product concentrations were exactly identical to the PPF except that the percentage of erythorbic acid was varied as shown below. Also, the same amount of salt solution was used in the tests: 273 grams PPF (as varied in erythorbic acid) plus 166.5 grams of saturated brine. The salt plus product mixture was passed through 138 ml of the same iron fouled water softener resin, containing 2339 mg Fe. The contact time was 45 minutes, plus or minus five minutes, at ambient temperature. The resin columns were then rinsed—slow and fast rinse—with deionized water.

The test results were:

| Erythorbic Acid | 3.6% | 2.7% | 1.8% | 0.9% |
|---|---|---|---|---|
| pH | 4.7 | 4.8 | 4.7 | 4.7 |
| Iron Removed, in mg Fe | 722 | 652 | 807 | 766 |

Please note that for these types of experiments (sampling of field resins, etc.) an error margin of ±5 percent is reasonable, and for the purpose intended the data will show an expected trend quite readily.

The results show that even less than 25 percent of the erythorbate are an adequate amount to be used for cleaning. As discussed earlier, a product that is to be used for preventive maintenance may even require less.

These experiments were repeated on a water softener resin from a different source, which contained 33 g $Fe/ft^3$, or 161 mg/138 ml resin.

The experiments were carried out in an identical manner as before.

The test results were:

| Erythorbic Acid | 3.6% | 1.8 | 0.9% | 0.45% | 0.22% |
|---|---|---|---|---|---|
| pH | 4.7 | 4.7 | 4.7 | 4.7 | 4.7 |
| Iron Removed, in mg Fe | 59.7 | 76.6 | 78.0 | 69.8 | 40.7 |

The results show that less than 0.9% but more than 0.45% erythorbic acid are desirable for use in a product that is used as a cleaner. One needs to keep in mind that the experiments were done in open containers.

Use as a Cleaner on Badly Fouled Resins

The batch cleaning tests were carried out to demonstrate, or underline, the variability of foulants on the iron removal capability of cleaners. While no attempt was made to identify the various foulants on the resin, the large differences in the extent of iron removal should, at least, demonstrate why current cleaners perform well in some cases and poorly in other instances.

For each experiment, 138 ml of water softener resins were used. The origin of the samples came from five different locations. Through each sample, 273 grams of PPF and 166.5 gram saturated brine were passed in 1 to 1¼ hours, followed by rinse water.

Figure 5:
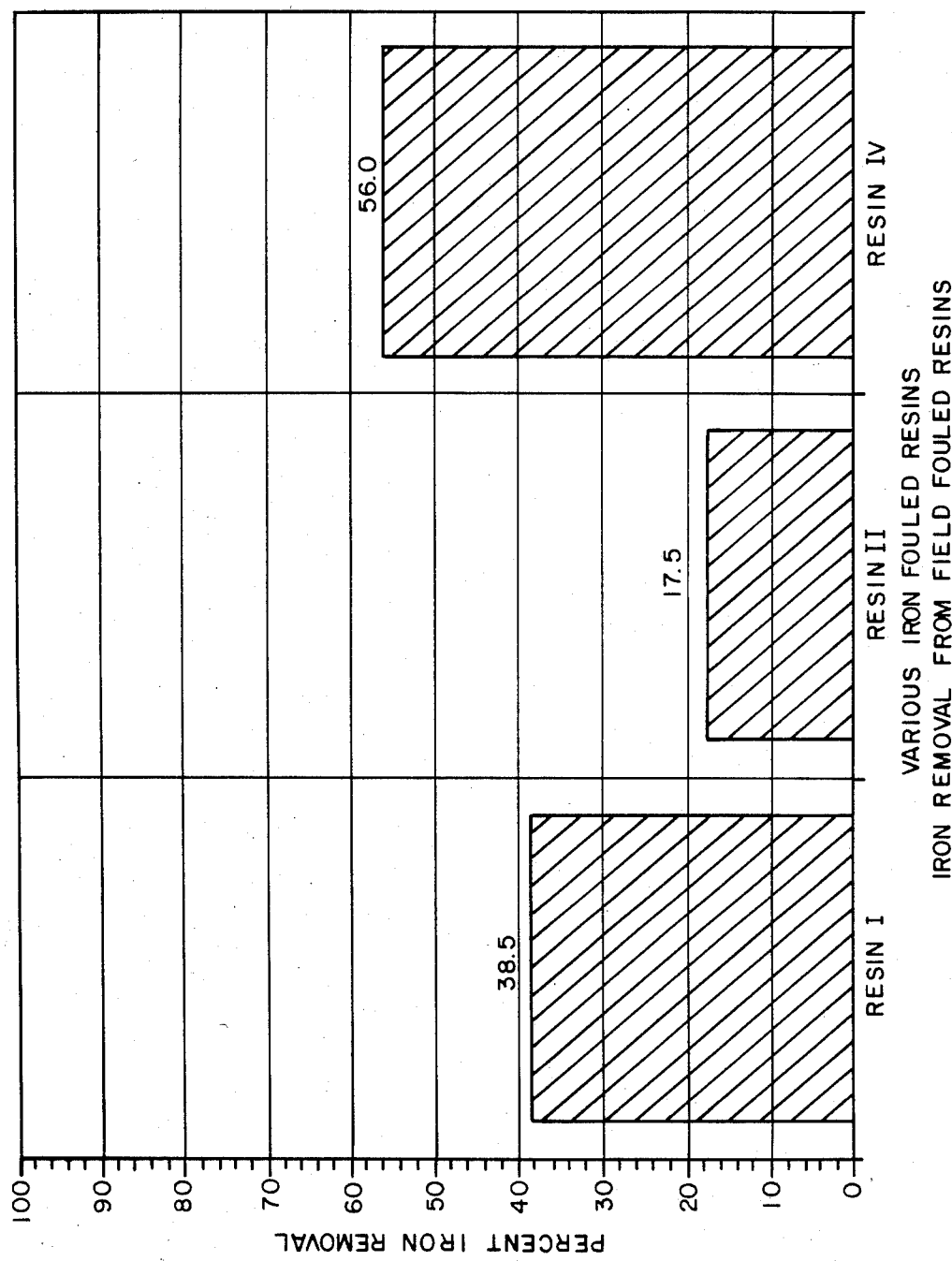
Figure 6:
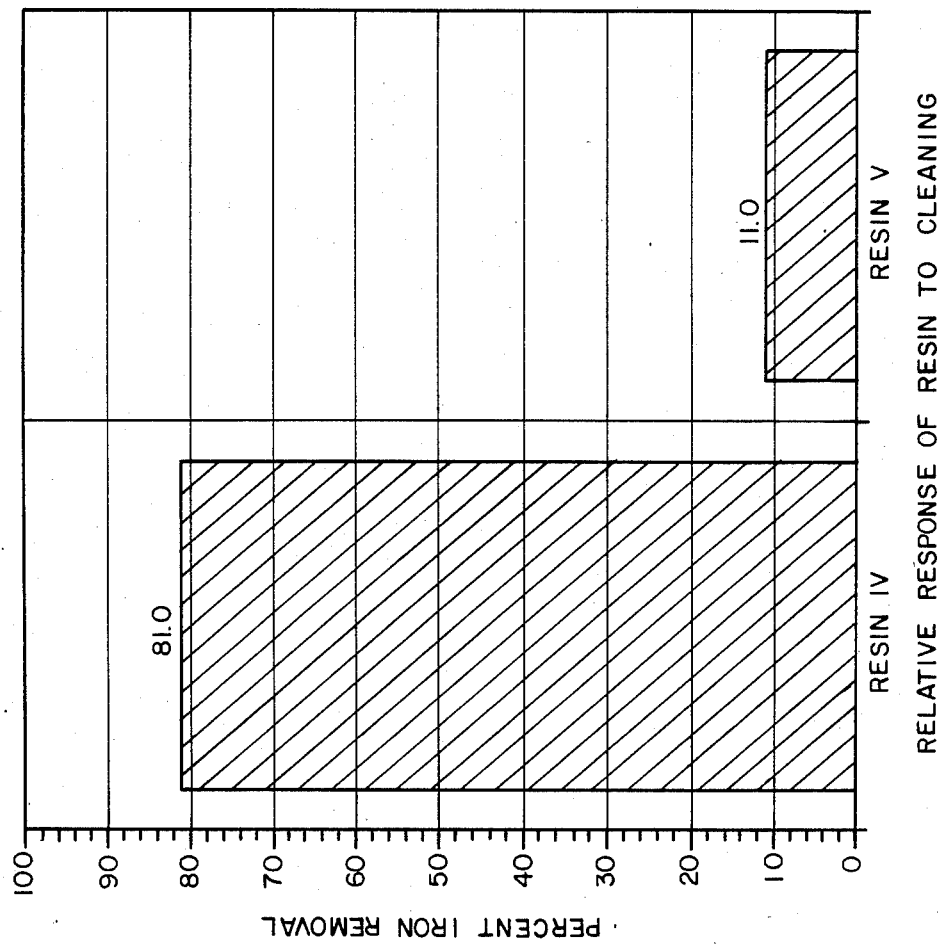

The test results are shown in FIGS. 5 and 6.

The results range from 11 to 81 percent iron removed. The data demonstrates that the product is a good cleaner, but at the same time it also illustrates that cleaning on a one-time basis is not ideal, since it gives erratic and often incomplete results. These results suggest that preventing the accumulation of iron is the most desirable goal.

Citric Acid as a Cleaner

For comparative purposes, a product consisting of 40% citric acid, 2% oxalic acid, 10% Alkasperse A0167, and 48% water was applied in the following manner:

The water softener resin (138 ml resin containing 2339 mg Fe) was fully regenerated with 25# NcCl/ft$^3$ for the removal of Ca and Mg to avoid a precipitation with oxalate or citrate. Then a 1:10 dilution with water was made, using 9.2 ml of the above formula and 82.8 ml water (pH 3.2). The resin was allowed to soak in this solution for four hours, then rinsed and again regenerated. The combined cleaner, rinse and regenerant was analyzed. It should be noted that a lapse time of about 10 hours was needed to carry out this cleaning plus regeneration.

Figure 7:
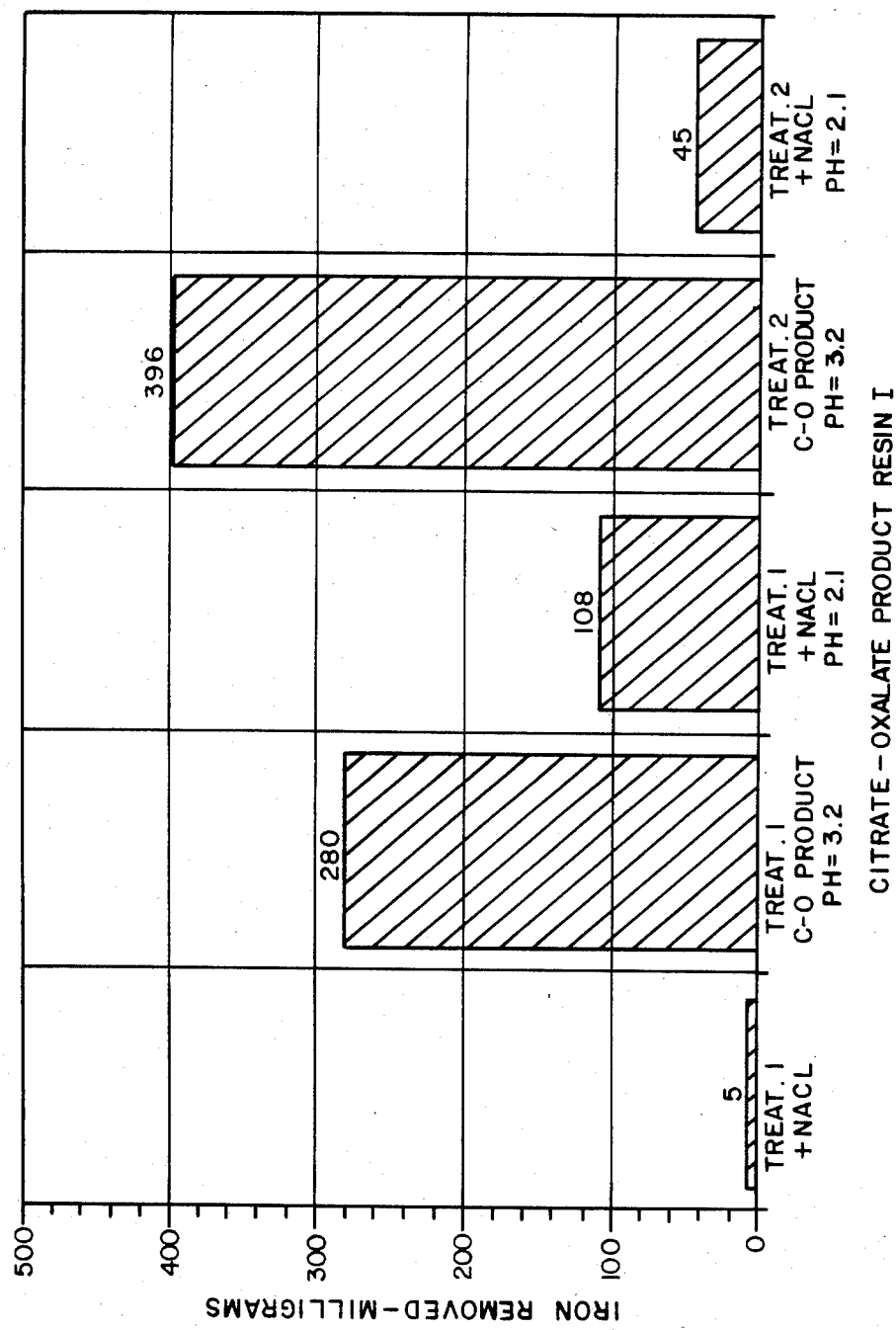

The results are shown in FIG. 7 and indicate a much poorer result.

Having described my invention, I claim:

1. A process for removing and preventing iron contamination of water treatment ion exchange resins which tend to become iron fouled by contact with feed waters containing iron contamination which process comprises, with each regeneration using a reagenerant salt solution, cyclically treating said water treatment solids with an effective amount of a combination product containing:
    (a) a reducing agent chosen from the group consisting of erythorbic acid, ascorbic acid, water-soluble salts thereof, reducing sugars, hydroquinone, or mixtures thereof;
    (b) a chelating agent; and wherein the pH of the regenerant solution is adjusted to within a range of about 2–8.

2. The process of claim 1 where the ion exchange resins are treated with a chelating agent which is an amino carboxylic acid, and the pH of the regenerant salt solution has been adjusted with a low molecular weight water-soluble aliphatic carboxylic acid to within the range of 4–6.

3. The method of claim 2 where the reducing agent is erythorbic acid or water-soluble salts thereof, the chelating agent is EDTA, and the aliphatic carboxylic acid is acetic acid.

4. A process for removing and preventing iron contamination of ion-exchange resins which tend to become iron fouled and which tend to become fouled with organic substances, microorganisms, and waste products thereof by contact with feed waters containing iron, organic substances, microorganisms and waste products thereof, which comprises cyclically treating the regenerant salt solution used to regenerate said water treatment solids with an effective amount of a product containing:
    (a) a reducing agent;
    (b) a chelating agent; and
    (c) a combination of a surfactant and a biodispersant; with the pH of said regenerant salt solution having been adjusted to within a range of about 4–6.

5. The process of claim 4 where the ion-exchange resins are treated with an effective amount of a product containing: erythorbic acid; an amino carboxylic acid; and a combination of a nonionic surfactant having an HLB between 6–14 and a biodispersant capable of producing at least a 45% change in Biomass when treating a biogrowth with 10 ppm of biodispersant for 1 hour, and the product also contains a biocide.

6. The method of claim 5 where product contains:

| Mix Order | Components | Wt. % |
| --- | --- | --- |
| 1 | Degasified D.I. water | 86.50 |
| 2 | EDTA Solution | 7.75 |
| 3 | Erythorbic Acid | 3.60 |
| 4 | Quaternary Amine Biocide, | 0.004 |
| 5 | polyethylene glycol ether of secondary alcohol having an HLB of 13.5 | 0.004 |
| 6 | block copolymer of propylene oxide and ethylene oxide having an HLB of 7 | 0.002 |
| 7 | Acetic Acid - adjust to pH 4.7 | 2.14 |
|   |   | 100.00% |

* * * * *